United States Patent [19]

Kuhn et al.

[11] 4,017,698

[45] Apr. 12, 1977

[54] DRAW-OUT TYPE CIRCUIT INTERRUPTER WITH MODULAR CONSTRUCTION

[75] Inventors: Edmund W. Kuhn; Jesse L. Uber; Joseph D. Findley, Jr., all of Pittsburgh, Pa.

[73] Assignee: Westinghouse Electric Corporation, Pittsburgh, Pa.

[22] Filed: Apr. 2, 1975

[21] Appl. No.: 564,573

[52] U.S. Cl. .......................... 200/50 AA; 335/160; 361/337

[51] Int. Cl.² ......................................... H01H 9/22

[58] Field of Search .............. 200/50 AA; 317/114, 317/120; 335/159, 160, 161, 162

[56] References Cited

UNITED STATES PATENTS

| | | | |
|---|---|---|---|
| 2,777,024 | 1/1957 | West | 200/50 AA |
| 3,621,339 | 11/1971 | Hodgson | 317/114 |

Primary Examiner—Harold Broome
Attorney, Agent, or Firm—Robert E. Converse, Jr.

[57] ABSTRACT

A circuit interrupter includes an automatic circuit breaker in a draw-out unit removably mounted within an enclosure. A levering mechanism is provided to lever out the draw-out unit on rails to permit complete disengagement of the circuit breaker from load and line terminals mounted within the enclosure without requiring unbolting operations. The circuit breaker includes an interrupter module, an operating module, and a control module, each of which includes a sub-frame supporting all module components. Each module is removably mounted in a main support structure and can be separately removed therefrom without removing the other two modules. Interlocks prevent removal of any module until the draw-out unit is levered out to the completely disengaged position.

5 Claims, 12 Drawing Figures

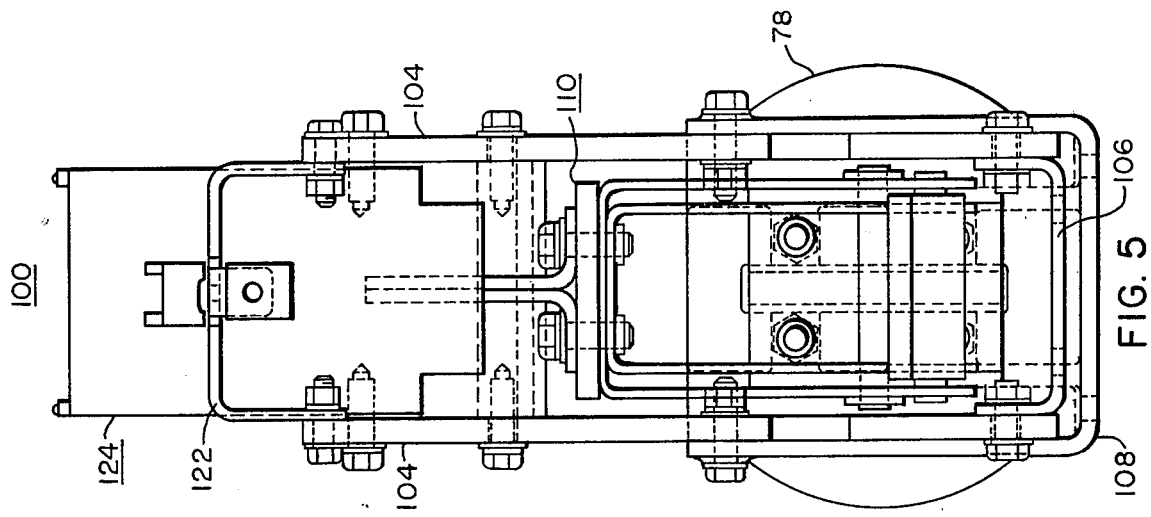
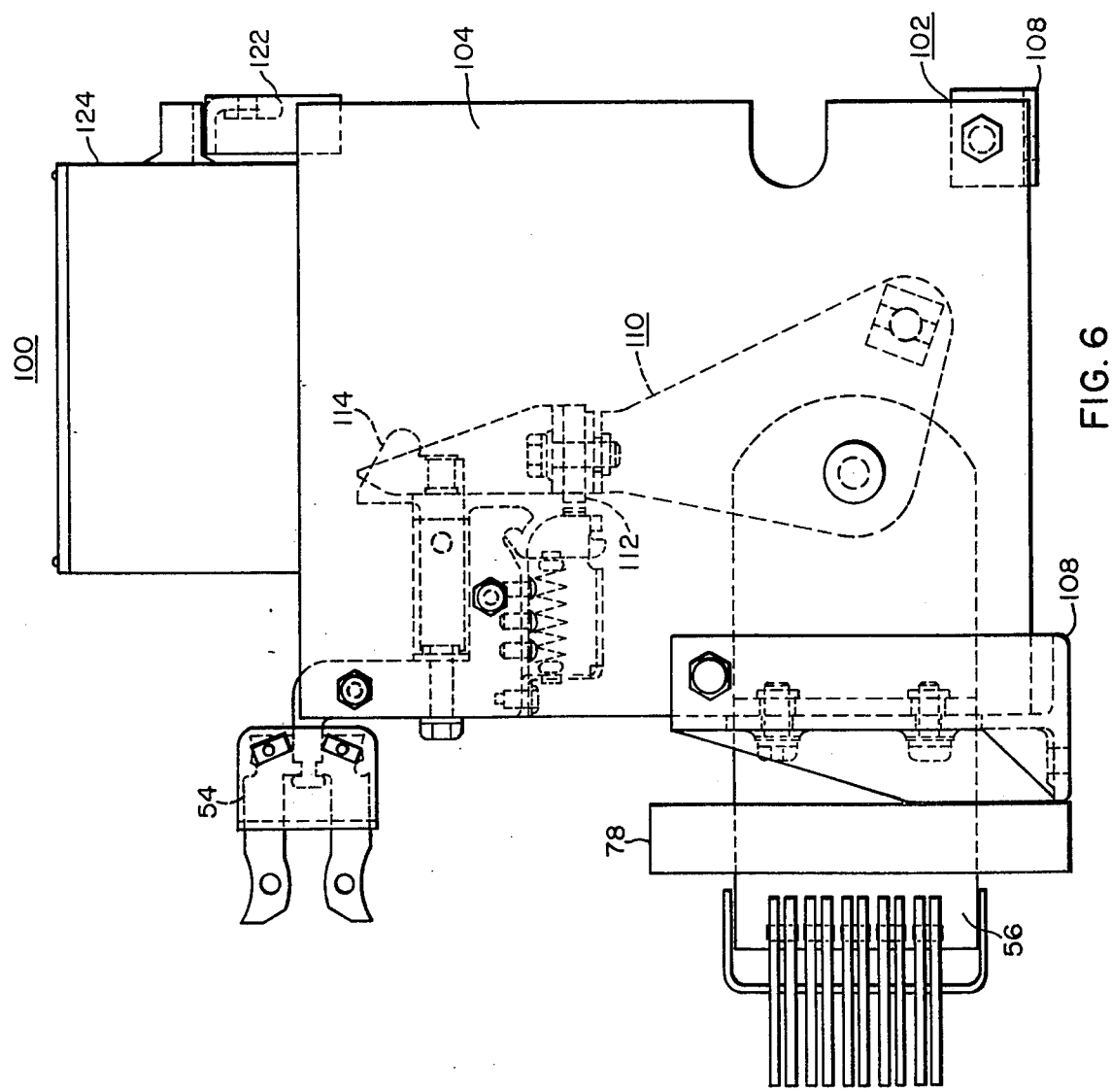

4,017,698

DRAW-OUT TYPE CIRCUIT INTERRUPTER WITH MODULAR CONSTRUCTION

CROSS-REFERENCES TO RELATED APPLICATIONS

This invention is related to U.S. Pat. application Ser. No. 564,574, entitled "Enclosed Circuit Interrupter With Door-Mounted Control Handle Mechanism" filed Apr. 2, 1975, by W. Paul Matty and Alan G. McGuffie; U.S. Pat. application Ser. No. 564,575 entitled "Enclosed Circuit Interrupter With Interlocked Safety Barrier" filed Apr. 2, 1975, by Edmund W. Kuhn, Alan G. McGuffie, and W. Paul Matty; U.S. Pat. application Ser. No. 564,576, entitled "Enclosed Circuit Interrupter With Improved Fuse Assembly" filed Apr. 2, 1975, by Edmund W. Kuhn and J. L. Uber; U.S. Pat. application Ser. No. 564,577, entitled "Drawout Type Circuit Interruptor With Interlocked Levering Mechanism" filed Apr. 2, 1975, by Edmund W. Kuhn and Alan G. McGuffie; and U.S. Pat. application Ser. No. 438,059, entitled "Gasket Assembly for Enclosed Electrical Apparatus" filed Jan. 30, 1974 by Edmund W. Kuhn. Each of the above-mentioned applications is assigned to the assignee of the present invention.

BACKGROUND OF THE INVENTION

1. Field of the Invention

The invention relates generally to electrical apparatus and more particularly to circuit interruptors for use with AC secondary network systems.

2. Description of the Prior Art

In supplying the nation's energy needs, two primary objectives of the electric utility industry are safety and reliability. Since the late 1920's the AC secondary network system has been used in downtown business districts and commercial areas to provide a high degree of service continuity. In the AC secondary network system, the secondary mains surrounding the area being served, such as a city block, are connected together to form a secondary network grid or mesh at low voltage from which the customer loads are supplied. The secondary network is supplied from a plurality of high voltage transmission lines or feeders through network transformers. The transformers reduce the high voltage necessary for transmission of electric energy to lower voltage suitable for distribution to customers. In the AC secondary network system the failure of any one feeder will not cause interruption to service because the load will be supplied over the remaining feeders. When a fault occurs in a high voltage feeder or in one of its associated network transformers, the input end of the feeder is disconnected from the system by opening of the feeder circuit breaker. However, it is also necessary that all network transformers on the faulted feeder be disconnected from the network by some form of protective device to prevent power from the network from being fed back through the network transformer to the fault. The automatic network protector was developed for this purpose. The network protector consists of a specially designed air circuit breaker with a closing and opening mechanism controlled by a network master relay and a network phasing relay. When the network protector is closed, the master relay functions to trip it when a reversal of power flow occurs. The master relay and the phasing relay act together to close the protector when, and only when, the correct voltage conditions exist across it.

Network protectors are often located outdoors or underground in vaults and must be protected by a sealed enclosure. When approached for service, testing, or maintenance, network protectors must be electrically and physically disconnected from the system on both the transformer and the load side. Historically, this consideration dictated the use of a rollout type circuit breaker which could be disconnected and rolled out of its enclosure for inspection and maintenance. Performing maintenance on prior art network protectors presented potential hazards to maintenance personnel since a piece of hardware, a tool, a fuse, or a disconnect link might be accidentally dropped into the protector and come in contact with components at high potential, causing a flash or arc-over and producing injury to maintenance personnel. Thus, it was desirable to remove the protector to a maintenance area in order to perform the required operation. The unitary construction of prior art network protectors made it difficult to perform maintenance upon a section of the network protector without taking the entire unit out of service. In order to replace a worn set of contacts, for example, it was necessary to remove the entire draw-out unit to the shop. This required either that a spare network protector be installed or that the network be served by one less feeder. Thus, it would be desirable to provide a circuit interruptor of modular construction which would allow removal of any module from the network protector without requiring removal of other modules. It would also be desirable to provide interlocks such that no module could be removed until the draw-out unit was completely disengaged from sources of high potential.

SUMMARY OF THE INVENTION

In accordance with the principles of the present invention there is provided a circuit interrupter of the draw-out type which includes a draw-out unit having a main support structure. The draw-out unit comprises an interrupter module including at least one pole unit having a pole unit sub-frame, means for removably mounting the pole unit sub-frame to the main support structure, load disconnect means secured to the pole unit sub-frame, line disconnect means secured to the pole unit sub-frame, a pair of separable contacts connected in series circuit relationship with the load and line disconnect means, an insulating operating rod for opening and closing the contacts, and means for sensing the current flow through the pole unit. The draw-out unit also includes a mechanism module comprising a mechanism sub-frame, means removably mounting the mechanism sub-frame to the main support structure, and an operating mechanism supported by the mechanism sub-frame for opening and closing the contacts of each of the pole units.

The draw-out unit also includes a control module comprising a control sub-frame, means removably connecting the control sub-frame to the main support structure, control means supported upon the control sub-frame, a removable cable assembly connecting the control means to the mechanism module, and removable wires connecting the current sensing means to the control means. The control means activate the operating module in response to either the current sensing means or to manual operation and activate the operating module through the removable cable assembly to cause the contacts to open and close. Disconnection of the single connecting points of each pole unit, and removal of the mounting means, the cable assembly, and the wires permits each of the modules to be removed from the main support structure without requiring removal of the other two modules. An interlock maintains the circuit interrupter in a trip free condition unless the control module is fully inserted into the main support structure.

A removable protective barrier and the network protector enclosure serve to restrict access to the mounting means of any module, thereby preventing removal of any module until the draw-out unit is completely disengaged from any source of high potential.

BRIEF DESCRIPTION OF THE DRAWINGS

FIG. 5 is a front elevational view of a single pole unit of the network protector;

FIG. 6 is a left side elevational view of the pole unit shown in FIG. 5;

DESCRIPTION OF THE PREFERRED EMBODIMENT

Figure 1:
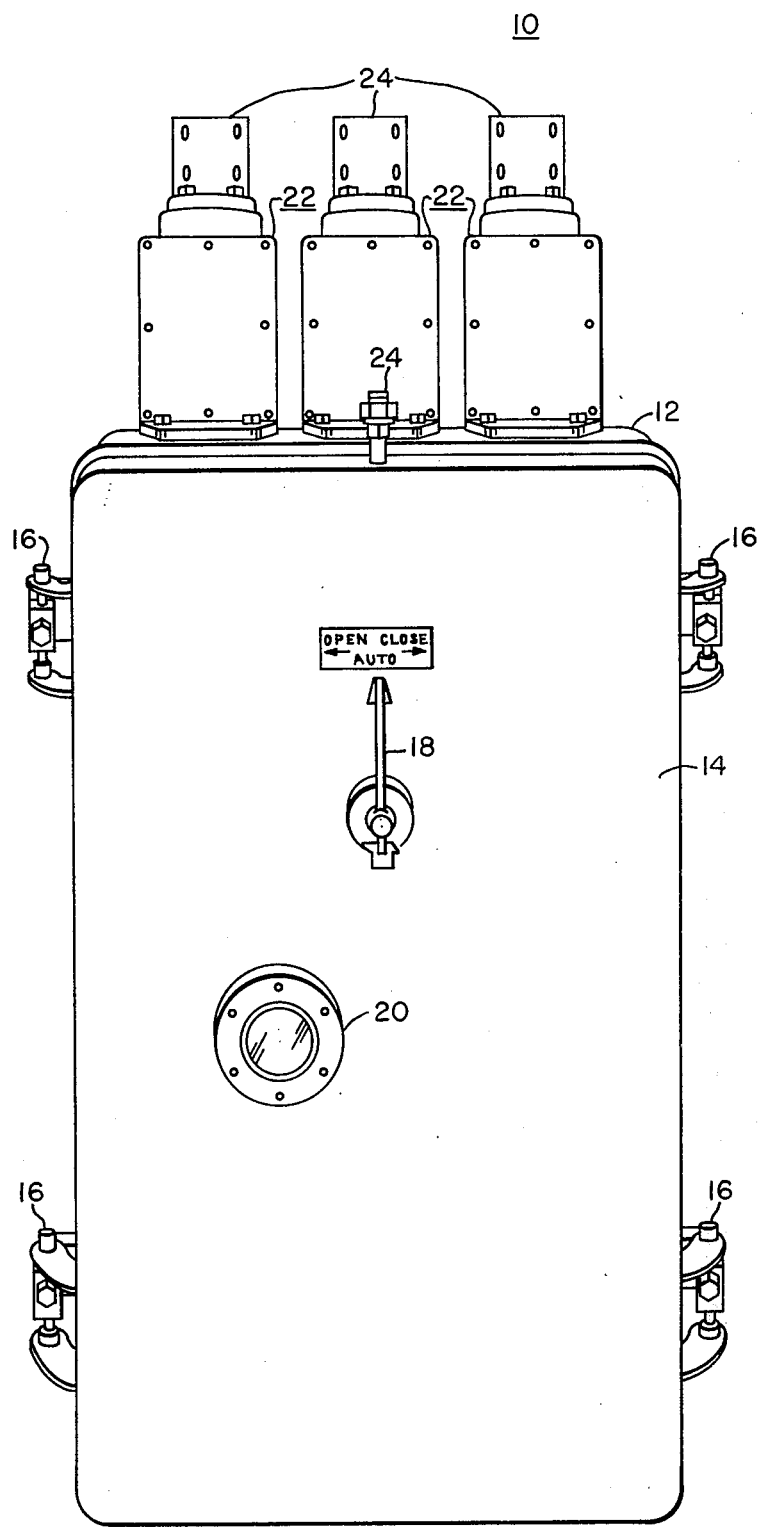
FIG. 1 is a front perspective view of a network protector constructed in accordance with the principles of the present invention.

Throughout the drawings corresponding reference characters refer to corresponding parts.

Referring now to the drawings, in FIG. 1 there is shown a network protector 10 constructed in accordance with the principles of the present invention. A steel enclosure 12 is provided with a door 14 secured to the enclosure 12 by four hinged fasteners 16. A control handle 18 extends through the door and serves to manually operate the network protector in a manner to be more completely described hereinafter. The door 14 is provided with a viewing window 20 through which to observe a flag 272 to indicate the position of the network protector contacts. Mounted on top of the enclosure 12 are three fuse assemblies 22, which include terminals 24 adapted for connection to the low voltage secondary network cables. The fuse assemblies 22 are more completely described in the aforementioned copending U.S. Pat. application Ser. No. 564,576, entitled "Enclosed Circuit Interruptor With Improved Fuse Assembly" (W.E. 45,929).

Figure 1A:
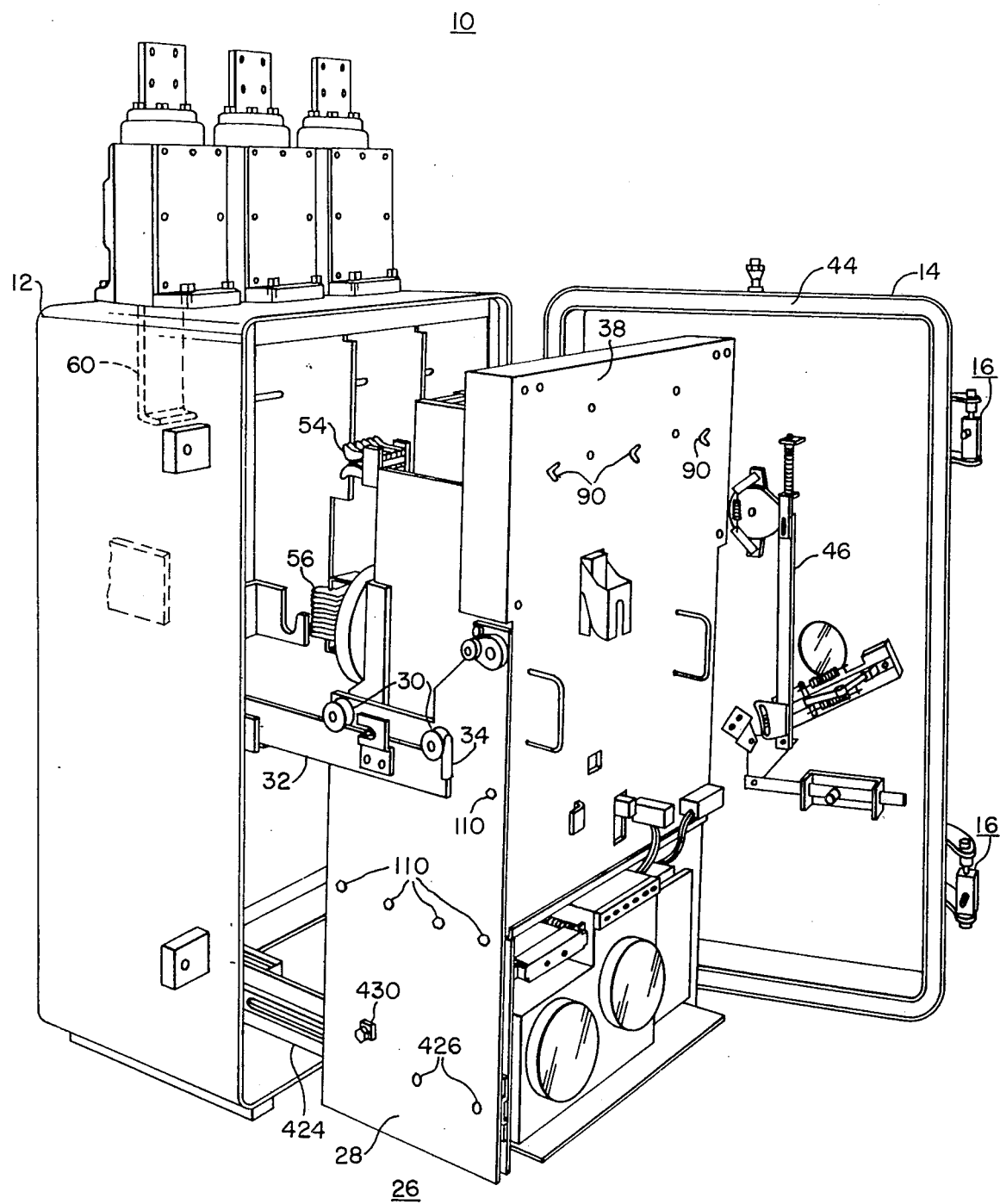
FIG. 1A is a perspective view of the network protector of FIG. 1 with the draw-out unit shown rolled out on rails from the protector enclosure.
Figure 2:
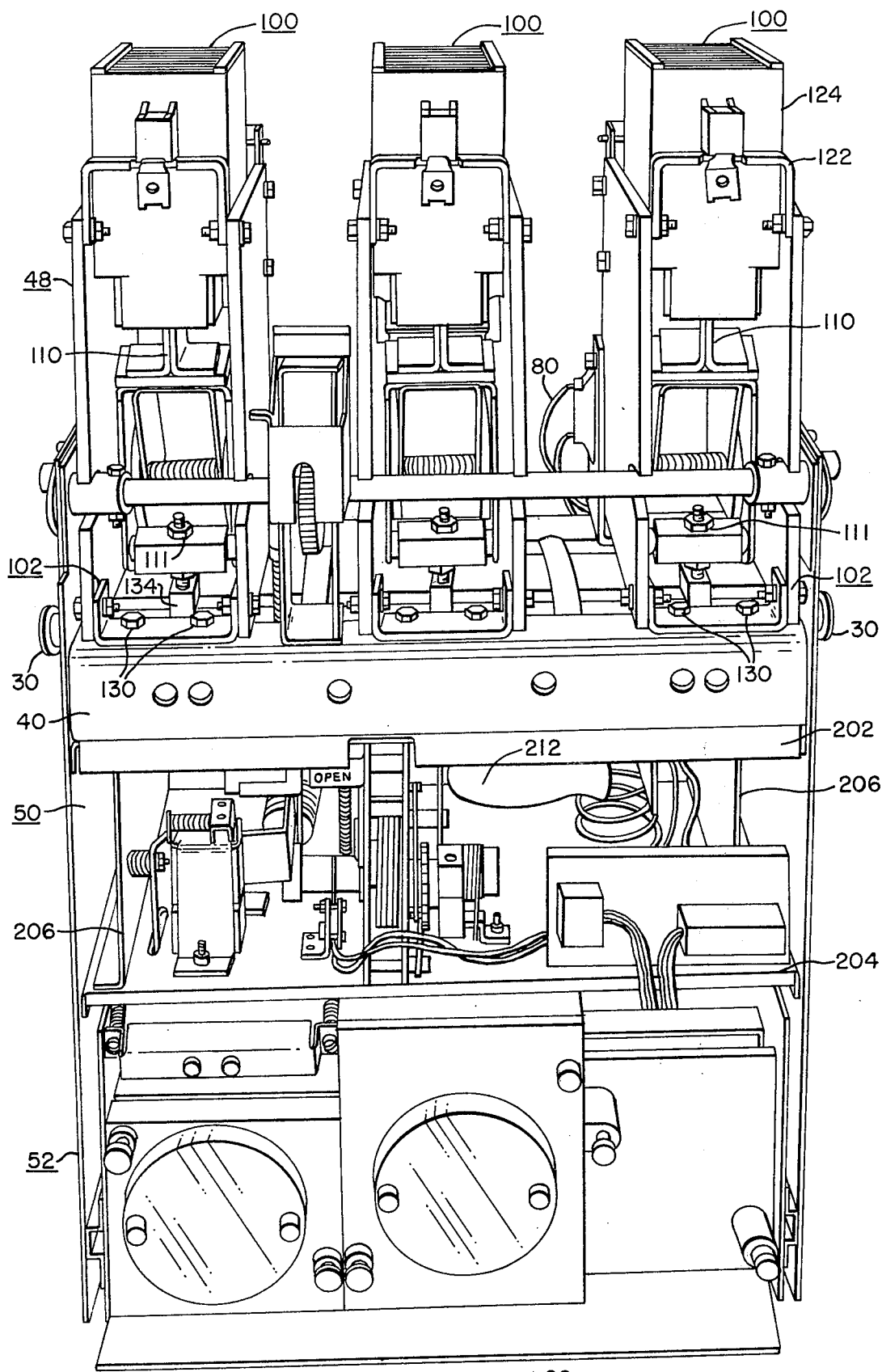
FIG. 2 is a front elevational view of the draw-out units shown in FIG. 1 with the protective barrier removed.

As shown in FIGS. 1A and 2, the network protector 10 includes a draw-out unit 26 supported by a main support frame 27. The main support frame 27 includes two side support plates 28 connected by welded steel channel members 40 and 42 shown more clearly in FIGS. 2 and 3. The two side support plates 28 (only one of which is visible in FIG. 1A) include rollers 30 supported by collapsible extension rails 32. The draw-out unit 26 is shown in FIG. 1A in the fully rolled out position. The travel of the draw-out unit 26 on the extension rails 32 is limited by the forward rollers 30 with stop pins 34 on each rail 32. In this position the draw-out unit 26 is completely disengaged from any source of high potential. A removable steel protector barrier 38 covers the upper part of the draw-out unit 26 between the side plates 28. The barrier 38 is fastened to the draw-out unit 26 by quarter-turn fasteners 90. A gasket 44 is mounted on the interior surface of the door 14 to form a water-tight seal against the edge of the enclosure 12 when the door is closed and fastened. The gasket 44 is more completely described in the aforementioned copending U.S. Pat. application Ser. No. 438,059, entitled "Gasket Assembly for Enclosed Electrical Apparatus". A control mechanism 46 is mounted on the interior surface of the door 14 and is connected to the handle 18. The control mechanism 46 more completely described in the aforementioned copending U.S. Pat. application Ser. No. 564,574, entitled "Enclosed Circuit Interruptor With Door Mounted Control Mechanism" includes a contact member 45 and a bumper member 47.

Figure 3:
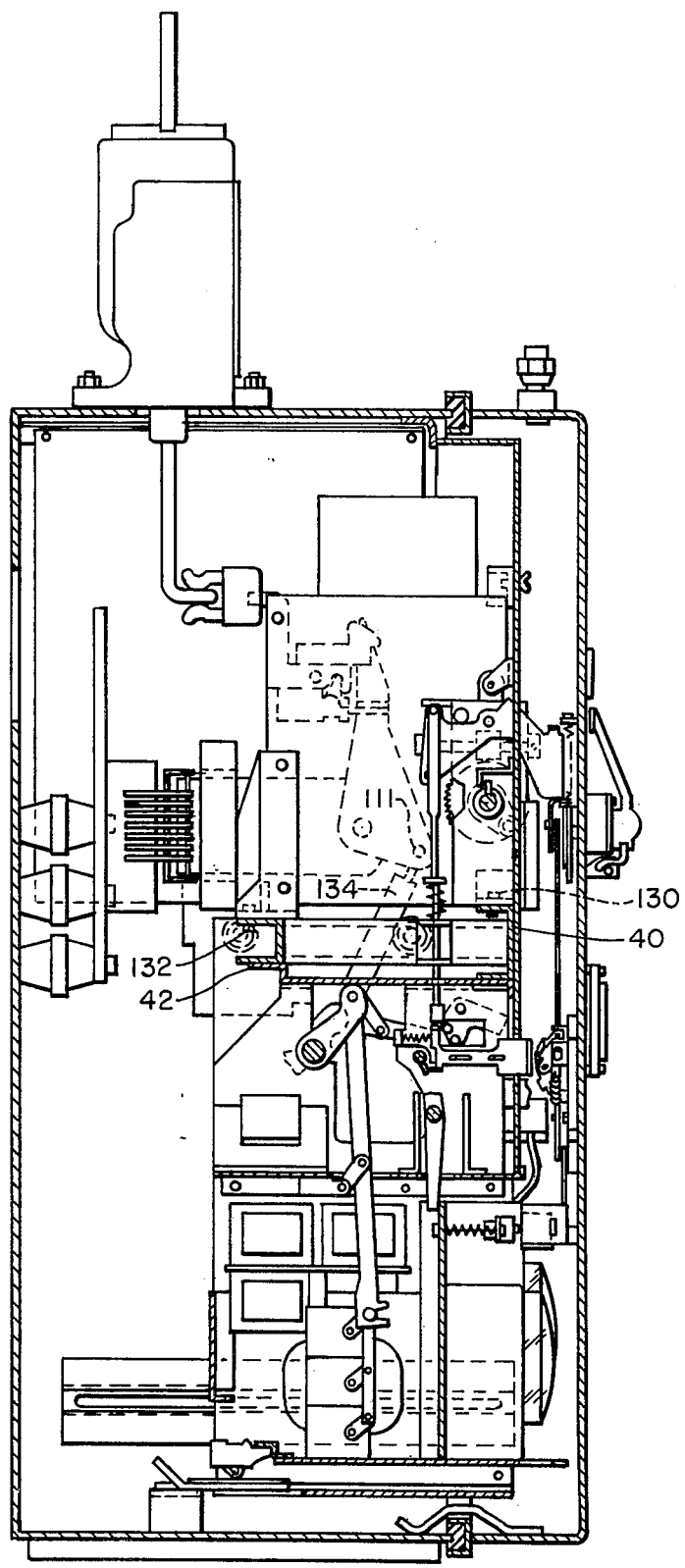
FIG. 3 is a sectional view of the draw-out unit taken substantially along the line III—III of FIG. 1.

Referring now to FIGS. 2 and 3, the draw-out unit 26 includes three modules 48, 50 and 52. The module 48 is the interrupter module and includes all of the draw-out unit components which are at high potential. All load current through the draw-out unit 26 flows through the interrupter module 48. The module 50 is the mechanism module and contains a motor-charged spring-driven mechanism 212 which serves to operate the current-carrying components of the interruptor module 48. The control module 52 contains components responsive to both manual operation and to network electrical conditions to command the mechanism module 50 to perform the proper opening or closing operations upon the interrupter module 48.

As will be more completely described hereinafter, the interrupter module 48 includes load disconnect structures 54 and line disconnect structures 56. When the draw-out unit 26 is rolled into the enclosure and levered into a completely engaged position, the line disconnect structures 56 engage line terminals 58 mounted in the enclosure 12 which are electrically connected to the secondary windings of the network transformer. The load disconnect structures 54 engage load terminals 60 mounted at the interior top of the enclosure 12 and connected to the secondary network from which customer services are fed.

Figure 4:
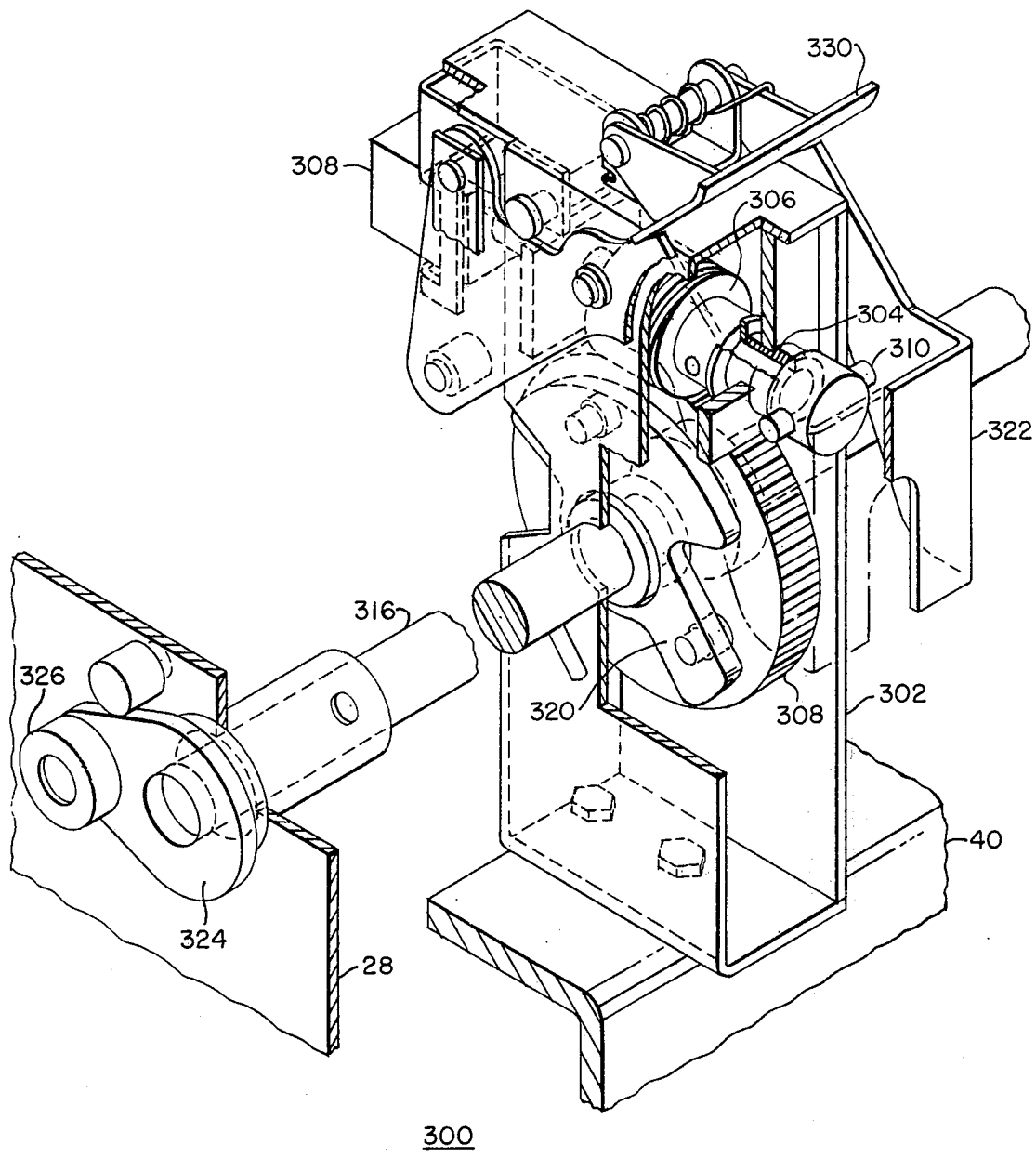
FIG. 4 is a perspective view of the lever mechanism shown in FIGS. 1 through 3.

A levering mechanism 300 is employed to operate the drawout unit 26 between engaged and disengaged positions. The levering mechanism 300, shown most clearly in FIG. 4, comprises a steel bracket 302 welded to the channel member 40 of the main support frame 27. A drive shaft 304 including worm gear 306 extends through the mounting bracket 302 in a direction perpendicular to the channel member 40. One end of the drive shaft 304 is threaded into a square traveling nut 308 which is located by a square aperture in the rear of the bracket 302. The end of the drive shaft 304 opposite the threaded end includes a pin 310 which can be engaged by a cooperating socket at the end of the operating crank, not shown. A levering shaft 316 extends through both side support plates 28 and through the mounting bracket 302 in a direction perpendicular to the drive shaft 304. Mounted upon the levering shaft 316 within the mounting bracket 302 is a main gear 318 which is engaged by the worm gear 306. Also, mounted upon the levering shaft 316 is an interlock cam 320 which cooperates with a shutter 322 pivotally secured to the mounting bracket 302 to provide a safety interlock for the operating crank. The interlock is more completely described in the aforementioned U.S. Pat. application Ser. No. 564,577, entitled "Drawout Type Circuit Interrupter With Interlock Levering Mechanism". At each end of the levering shaft 316 is an engaging lever 324 containing a roller 326. The levers 324 and rollers 326 cooperate with "J" shaped hooks 328 (FIG. 1A) mounted upon the enclosure 12. A spring-loaded pivot plate 330 is mounted at the top of the mounting bracket 302 and serves to prevent the raising of the shutter 322 unless lifted by the protective barrier 38, or otherwise displaced.

In order to operate the drawout unit 26 from the disengaged fully rolled out position as shown in FIG. 1A to the fully engaged position as shown in FIG. 3, the drawout unit 26 is manually rolled back along the rails 32 into the enclosure 12 until the rollers 326 contact the rear edge of the J shaped hooks 328. In this position the disconnect structures 58 and 60 are still physically separated from the terminals 54 and 56. The shutter 322 is then raised to allow insertion of the operating crank and engagement of the drive shaft 304. The crank is then operated to cause counterclockwise rotation of the drive shaft 304. The attached worm gear 306 will also rotate in a counterclockwise direction to cause corresponding counterclockwise rotation of the levering shaft 316 and levers 324. The rollers 326 will move downward into the slot of the J shaped hooks 328, pulling the drawout unit 26 into the enclosure 12.

Continued rotation of the operating crank 314 will cause continued rotation of the levers 324, pulling the drawout unit 26 into completely engaged position within the enclosure 12. In this position, as shown in FIG. 3, the disconnect structures 54 and 56 engage the terminals 60 and 58. As the crank is rotated, the traveling nut 308 is constrained by the square aperture in the mounting bracket 302 and is drawn inward along the threaded end of the drive shaft 304. When the drawout unit 26 reaches the fully engaged position, the threaded end of the drive shaft 304 contacts the bottom of the traveling nut 308, effectively preventing further rotation of the crank and drive shaft 304.

As can be seen in FIG. 2, the interrupter module 48 includes three separate pole units 100. One of the pole units 100 is more clearly shown in FIGS. 5 and 6. Each pole unit 100 comprises a pole sub-frame 102 which includes a pair of pole plates 104 of glass polyester joined by a metal U bracket 106 and a mounting structure 108. The line disconnect structure 56 is attached to the mounting structure 108 and extends therethrough. Also attached to each mounting structure 108 and surrounding the line disconnect structure 56 is a current transformer 78 electrically connected by wires 80 to the control module 52. Wires 81 are attached to each disconnect structure 56 to supply power to the control module 52. A moving contact structure 110 is pivotally connected to the line disconnect structure 56 and includes a main moving contact 112 and a moving arcing contact 114. As can be seen in FIG. 6, the load disconnect structure 54 is mounted between the two pole plates 104 and includes a fixed main contact 118 and a fixed arcing contact 120 which engage the main moving contact 112 and the moving arcing contact 114 when the moving contact structure 110 is in a closed circuit position as seen in FIG. 6. Pivotal movement of the moving contact structures 110 serves to separate the contacts 112, 114 from the contacts 118, 120 and interrupts the circuit between the line disconnect structure 56 and load disconnect structure 54. A U-shaped connected bracket 122 bridges the two pole plates 104 and supports an arc chute 124 (FIG. 5) comprising an insulating structure 126 supporting interiorly thereof a plurality of spaced conductive arc extinguishing plates (not shown). The arc chute 124 serves to confine an arc produced during a contact opening operation and extinguish the arc in a well known manner. The U-shaped connecting bracket 122 also includes a seat for the quarter-turn fastener 90 which secures the protective barrier 38 to the draw-out unit 26.

The pole unit sub-frame 102 is secured to the front channel member 40 by bolts 130 and to the rear channel member 42 by bolts 132 (FIG. 3). The moving contact structure 110 is pivotally connected as at 111 to one end of an insulating operating rod 134, the other end of which is connected to the operating mechanism 212 in a manner to be hereinafter described. It is important to note that all components of the pole units 100 are supported by the pole unit sub-frames 102 rather than directly by the main support frame 27. The point 111 is the only connection point between the pole units 100 of the interrupter module 48 and the mechanism module 50. The bolts 130 and 132 are the only mechanical connections between the pole sub-frame 102 and the main support frame 27. Thus, the interrupter module 48 or any pole unit 100 thereof may be completely removed from the draw-out unit 26 merely be removing the bolts 130 and 132, disconnecting the operating rods 134 at the connecting points 111, and disconnecting the wires 80 and 81. For example, worn contacts can be replaced by substituting a spare pole unit 100 and returning only the pole unit with the worn contacts to the shop for maintenance rather than returning the entire draw-out unit, as was necessary with prior art network protectors.

Figure 7:
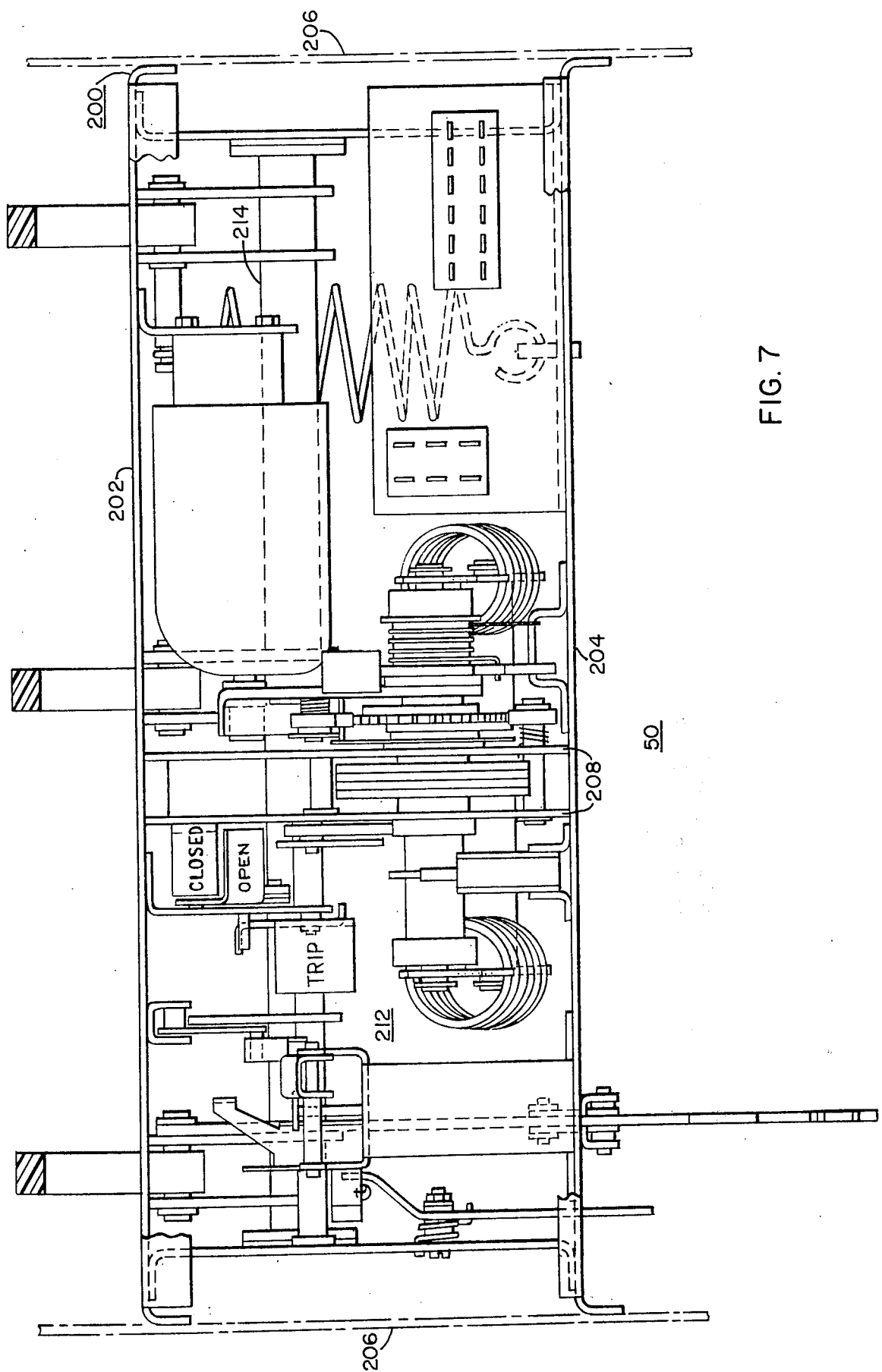
FIG. 7 is a front elevational view of the mechanism module shown in FIGS. 2 and 3.
Figure 8:
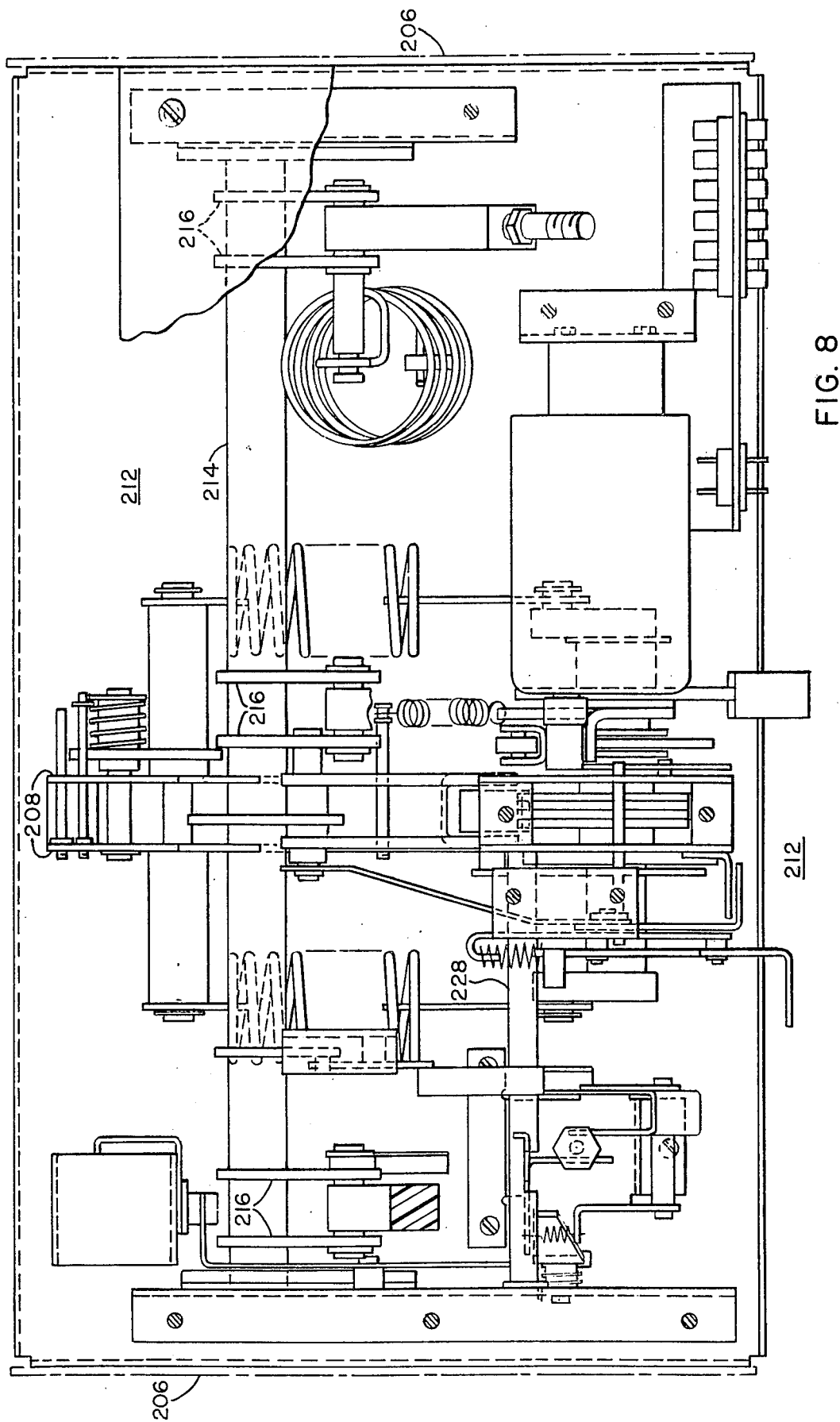
FIG. 8 is a top view of the mechanism module shown in FIG. 7.
Figure 9:
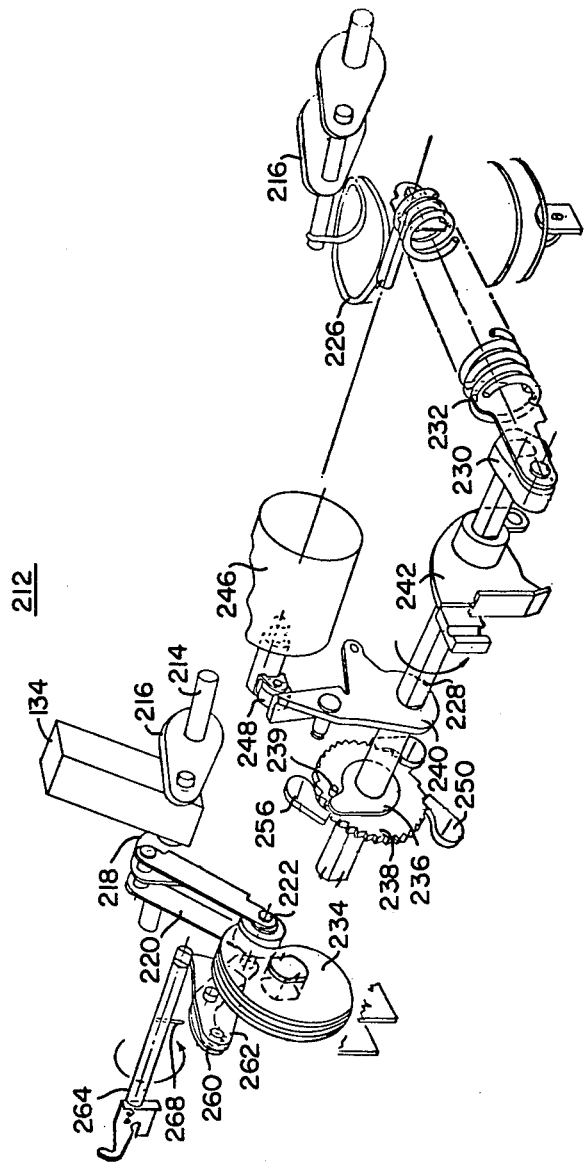
FIG. 9 is a perspective view of the operating mechanism shown in FIGS. 7 and 8 with some components omitted for clarity.

The mechanism module 50 is shown more clearly in FIGS. 7, 8 and 9. A mechanism sub-frame 200 includes a top pan 202 and bottom pan 204 joined by two side plates 206 and two center plates 208. The mechanism sub-frame 200 is mounted upon the main support frame 27 by sixteen bolts 210 (FIG. 1A) which extend through the side support plates 28 and side plates 206 of the mechanism sub-frame 200. The mechanism sub-frame 200 supports a motor-charged, spring-driven mechanism 212 which serves to rapidly open or close the pole units of the interrupter module 48 upon command from the control module 52. The mechanism 212 is similar to the mechanism described in U.S. Pat. No. 3,600,540 issued Aug. 17, 1971 to Fred Bould and assigned to the assignee of the present invention. Thus, the mechanism 212 will be only briefly described.

A jack shaft 214 is supported by the side plates 206 and center plates 208. Welded to the jack shaft 214 are three double levers 216 which are pivotally connected to the free ends of the insulating operating shafts 134, the other ends of which are connected to the moving contact structure 110. A crank 218 welded to the jack shaft 214 is connected by a main drive link 220 and roller 222 to a close cam 234. An opening spring 226 is connected to the right hand lever 216 and is placed in tension when the interrupter unit contacts are in a closed circuit position.

As can be seen most clearly in FIG. 9, the motor charging portion of the mechanism 212 includes a crank shaft 228 having four flat surfaces machined upon it and a crank arm 230 attached to each end. Each crank arm 230 connects to a closing spring 232. The rear of the springs 232 anchor to the rear of the center plate 208. The crank arms 230 are keyed to the crank shaft 228 by machined surfaces matching the flat surfaces of the crank shaft 228. The close cam 234, a seal-in cam 290 (FIG. 2), and a pair of drive plates 236 (only one of which is visible in FIG. 9) are similarly keyed to the crank shaft 228. A ratchet wheel 238, oscillator 240, emergency charge device 242, and a pawl lifter (not shown) are free to rotate about the crank shaft 228. A motor 246 including a roller 248 for driving the oscillator 240 is supported in the righthand portion of the mechanism sub-frame 200. A hold pawl 250 is pivotally mounted to a center plate 208.

In operation, rotation of the motor 246 and the roller 248 pushes the oscillator arm 240 counterclockwwise, and an oscillator pawl 256, attached to the oscillator arm 240, engages the ratchet wheel 238 to rotate the ratchet wheel 238 slightly more than one tooth in the counterclockwise direction. The hold pawl 250 snaps behind the corresponding advanced tooth and holds the ratchet wheel 238 as the oscillator 240 returns in a clockwise direction to engage a further tooth. Thus, the ratchet wheel 238 rotates counterclockwise until the ratchet wheel pin 239 engages the two drive plates 236 (only one of which is visible to FIG. 9) which in turn rotate the crank shaft assembly and compress the closing springs 232, thereby charging them. A switch 291 (FIG. 2) is actuated by the seal-in cam 290 to seal in the electrical supply to the motor 246. The spring charging continues until the crank arms 230 are overcenter and the closing springs 232 are fully compressed. The closing spring torque then drives the crank shaft 228 counterclockwise. As the crank shaft 228 and close cam 234 rotate, the main drive link roller 222 follows the close cam 234. When the crank arm 230 is rotated past the overcenter position, the closing springs 232 cause the crank shaft 228 and close cam 234 to rotate, causing the main drive link roller 222 and main drive link 220 to operate the jack shaft 214 and close the contacts of the interrupter module 48.

A link 276 (FIG. 3) connected to the left hand double lever 216 extends downward through the bottom pan 204 into the control module and engages auxiliary switches 280. Operation of the jack shaft 214 to close the interrupter module contacts also operates the link 276 and switches 280 and de-energizes the motor 246.

During the closing operation, the lobes of the pawl lifter (not shown in FIG. 9) disengage the drive and hold pawls from the ratchet wheel 238. Thus, the stopping point of the motor is not critical.

The mechanism 212 is provided with an emergency hand closing capability. Hand operation is similar to that of the motor and oscillator except that a manual pumping action upon the fitting 39 (FIGS. 1A and 2) drives the emergency charge pawl 243 attached to the emergency charge device 242 to advance the ratchet wheel 238.

This mechanism is of the general variety of mechanically trip-free mechanisms. This means that the breaker can open or trip free from the closing mechanism at any point in the closing stroke.

It can be seen in FIG. 9 that the main drive link roller 222 is constrained to move in a circular path by the roller constraining link 260 which pivots about a pin on a trip latch 262. The trip latch 262 is restrained from rotating by the D-shaped end of the trip shaft 264. When the trip shaft 264 is rotated, the trip latch 262 is released and restraint removed from the main drive link 220. The biasing action of the opening spring 226 upon the levers 216 cause the latch 262 to rotate in a counterclockwise direction (FIG. 9). Under this condition the breaker, if closed, will open. With the breaker thus tripped the left hand end of the constraining link 260 is moved. Thus no closing force can be transmitted to the jack shaft 214 and the interrupter module 48 cannot be closed.

Referring to FIG. 3, it will be seen that a trip plate structure 266 is provided which, when depressed, engages a pin 268 to rotate the trip shaft 264 and perform a tripping operation as previously described. The trip plate structure 266 operates with an interlock structure 270 linked to a shutter 322 providing access to the levering mechanism 300. The interlock structure 270 is more completely described in the aforementioned copending U.S. Pat. application Ser. No. 564,577, entitled "Drawout Type Circuit Interrupter With Interlocked Levering Mechanism". An indicator flag 272 is driven by a link (not shown) attached to the crank 218 (FIG. 9) to indicate the position of the contacts of the interrupter module 48. A shunt trip unit 284 (FIGS. 2 and 7) is mounted upon the bottom pan 204 to provide an electrically actuated mechanical tripping operation through a trip lever (FIG. 9) when the shunt trip unit 284 is energized by the control module 52.

Again, note that all components of the mechanism module 50 are supported by the mechanism sub-frame 200 rather than directly by the main support frame 27. Thus, the entire mechanism module 50 can be removed from the drawout unit 26 as a unitary structure.

Figure 10:
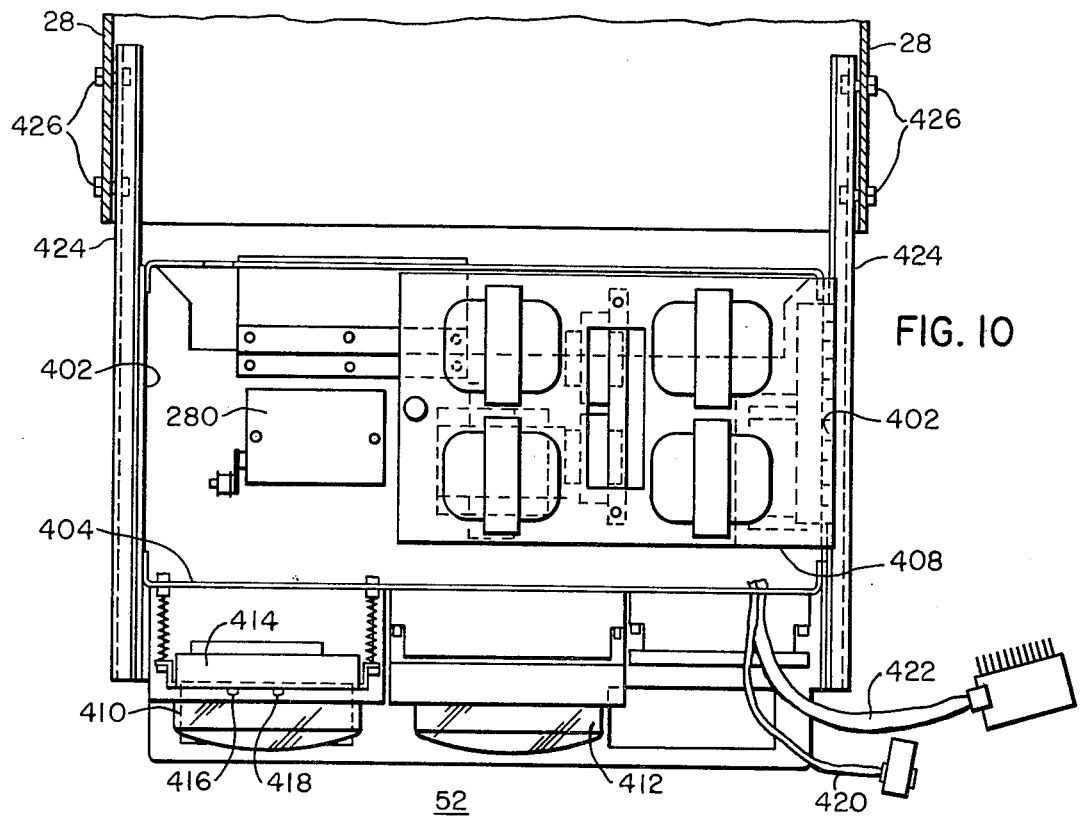
FIG. 10 is a top view of the control module shown in FIGS. 1, 2 and 3 with the control module extended out on slides.
Figure 11:
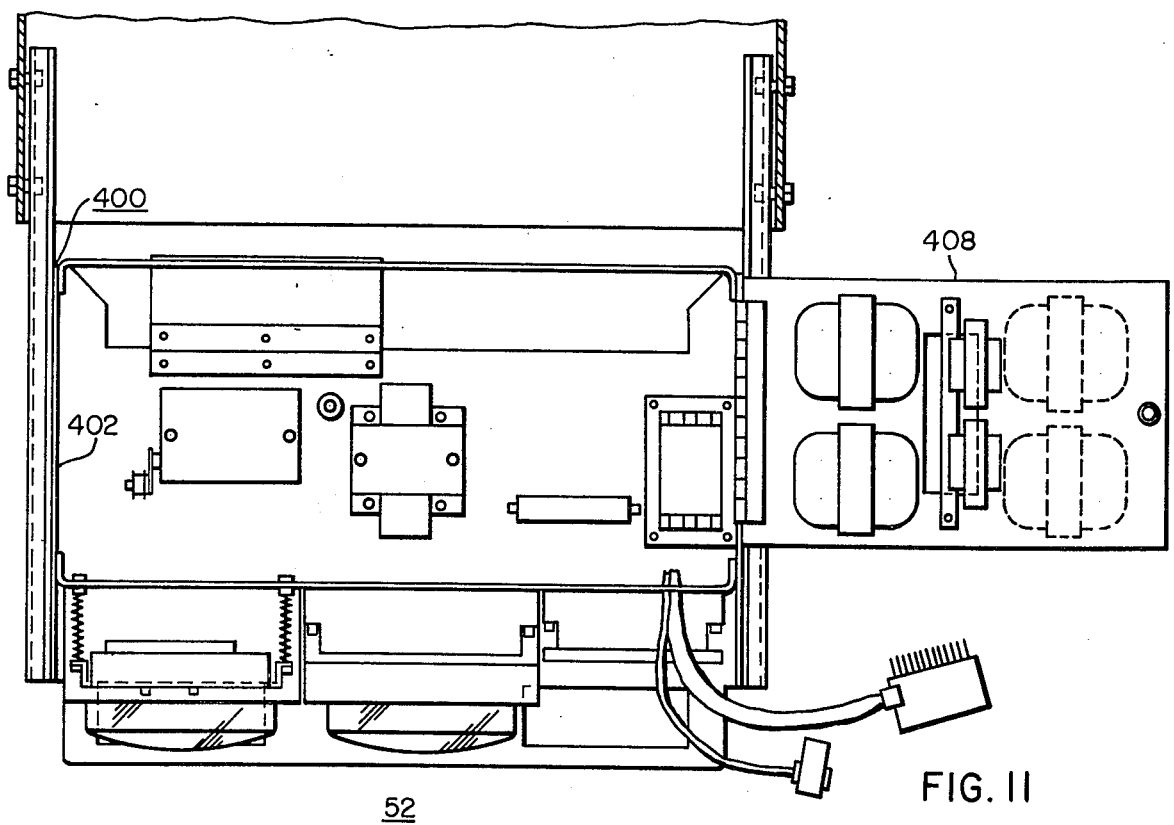
FIG. 11 is similar to FIG. 10, with the hinged subchassis shown folded out.

Referring now to FIGS. 3, 10, and 11, there is shown the control module 52 supported upon a control sub-frame 400. The control module sub-frame 400 includes two side plates 402 joined by a front panel 404 and a chassis 406. A sub-chassis 408 is pivotally supported upon the right side of the plate 402 behind the panel 404. A network master relay 410 and a phasing relay 412 are mounted upon the front panel 404. Above the master relay 410 is a resiliently mounted switch bracket 414 containing a CLOSE microswitch 416 and AUTO microswitch 418. The microswitches 416 and 418 are operated by the bumper member 47 of the door mounted control mechanism 46 (FIG. 1A). Extending from the front panel to the right of the phasing relay 112 are two cable assemblies 420 and 422 which plug into sockets in the front of the mechanism module 50 to carry the control signals thereto.

Affixed to each side plate 402 is a slotted rail member 424 which is slidingly supported by bolts 426 extending through the side support plates 28. Setscrews 430 (FIG. 1A) also extend through both side support plates 28. When loosened, the setscrews 430 allow the entire control module 52 to be slided outward from the draw-out unit 26 upon the rail members 424. Access can thus be obtained to all components of the control module 52. In addition, the hinged subchassis 408 can be swung outward as shown in FIG. 11 to provide access to the power supply components of the control module. By removing the bolts 426, the entire control module 52 can be completely removed from the draw-out unit 26. A spring loaded lever 432 (FIGS. 3 and 7) mounted on the mechanism left side plate has its position controlled by the control module front panel 404. If the control module 52 is removed, the lever 432 is spring driven against the trip lever 285 to block the resetting of the trip shaft 264. This prevents activation of the operating mechanism 212 to close the interrupter module 48 unless the control module 52 is fully inserted into the draw-out unit 26, maintaining the mechanism 212 in a trip-free condition.

In order to operate the network protector 10, the control module 52 must be fully inserted into its position within the draw-out unit 26 to operate the lever 432. The entire draw-out unit 26 must then be rolled along extension rails 32 until the engaging lever 324 contacts the hook 328. The levering crank is then inserted under the shutter 322 and turned to operate the lever mechanism 300 as previously described. The engaging lever 324 will thus rotate in a counterclockwise direction, thereby drawing draw-out unit 26 into the enclosure 12 and the load and line disconnect structures 54, 56 into complete engagement with the load and line terminals 60, 58. Under normal procedure the door 14 is then closed and the handle 18 operated to either the CLOSE or AUTO positions. When the handle 18 is moved momentarily to the CLOSE position the bumper member 47 activates the CLOSE switch 416 to command the mechanism 212 to operate to close the contacts of the interrupter module 48 and complete a circuit from the line terminals 58 to the load terminals 60. When the trip plate 266 is depressed (either by operation of the door mechanism 46 or direct manual operation) it operates the trip pin 268 to rotate the trip shaft 264, releasing the trip latch 262 and allowing the opening spring 226 to rotate the jack shaft 214 and open the contacts of the interrupter module 48.

The contacts will also open if reverse current flow (from the load terminals 60 to the line terminals 58) is detected, at which time the control module 52 will energize the shunt trip device 284. This operates the trip lever 285 which rotates the trip shaft 264, causing the contacts of the interrupter module 48 to open, as in a manual trip operation.

If the handle 18 is moved to the AUTO position, the bumper member 47 will activate the AUTO switch 418 causing the control module 52 to monitor the voltage conditions between the load terminals 60 and the line terminals 58. If, and only if, the voltage magnitude and phase are such as to cause current flow from the line terminals 58 to the load terminals 60, the control module will command the mechanism 212 to operate to close the contacts of the interrupter module 48. Again, if reverse current flow is subsequently detected, the control module 52 will energize the shunt trip mechanism 284 to open the interrupter module contacts. The construction and operation of the handle 18 and control mechanism 46 mounted on the interior surface of the door 14 is more clearly described in the aforementioned U.S. Pat. application Ser. No. 564,574, entitled "Enclosed Circuit Interrupter With Door Mounted Control Handle Mechanism".

The modular construction of the network protector 10 greatly increases convenience of maintenance. Instead of removing the entire draw-out unit 26 to a shop area for maintenance as was the case with prior art network protectors, it is possible to easily remove any individual module of the draw-out unit 26 for maintenance. The control module 52 can be removed by loosening the setscrew 428 and sliding the control module 52 out along the rail members 424. The bolts 426 are then removed to allow complete removal of the entire control module 52. The mechanism module 50 can be removed by disconnecting the insulating operating rods 134 from the moving contact structure 110 of each pole unit 100 and removing the bolts 210 extending through the side support plates 28. Removal of the interrupter module 48 can be accomplished by disconnecting the insulating operating rod 134 from the moving contact structure 110 and removing the bolts 130 and 132 which extend through the pole sub-frame into the channel supports 40 and 42. Thus, the components of each of the modules 48, 50 and 52 are mounted upon sub-frames 102, 200, and 400, which are, in turn, secured to the main support frame 27.

Certain components of the drawout unit 26 are at high potential when the draw-out unit 26 is fully levered into the enclosure 12 to engage the load and line terminals 60 and 58. Removal of any module while the draw-out unit is in this position would thus present a safety hazard. However, removal of any module is prevented by the safety barrier 38 and enclosure 12 which render the module mounting bolts inaccessible when the draw-out unit 26 is fully levered into the enclosure 12. Thus, any contact with components of the network protector at high potential is prevented.

It can be seen, therefore, that the invention provides a new and improved network protector exhibiting greater flexibility, easier maintenance, and improved safety to operating personnel.

We claim:
1. A drawout type circuit interrupter, comprising:
a housing;
load and line terminals mounted upon said housing; and
a drawout unit mounted in said housing and comprising:
a main support structure;
an interrupter module comprising separable contacts operable between open and closed positions, load and line connectors cooperating with said load and line terminals, and an interrupter module sub-frame removably mounted upon said main support structure and supporting said contacts and said connectors;
a mechanism module comprising an operating mechanism for operating said separable contacts between open and closed positions and a mechanism module sub-frame removably mounted upon said main support structure and supporting said operating mechanism;
a control module for electrically activating said operating mechanism to operate said contacts between open and closed positions, said control module comprisng electrical control components and a control module sub-frame removably mounted upon said main support structure and supporting said control components;
trip means coupled to said mechanism module and operable upon actuation to cause said mechanism module to operate said contacts to an open position; and
an interlock lever associated with said trip means and extending into proximity to said control module, said lever being movable between a first position and a second position, movement of said lever to said second position actuating said trip means, said control module maintaining said lever in said first position and preventing movement of said lever to said second position if and only if said control module is fully inserted into said main support structure;

said drawout unit being movable between a connected position wherein said load and line connectors engage said load and line terminals to bridge said contacts across said load and line terminals, and a disconnected position wherein said connectors are separated from said terminals and said drawout unit is electrically isolated from said terminals.

2. A circuit interruptor as recited in claim 1 wherein said lever when in said second position maintains said trip means in a trip free condition whereby said contacts are incapable of being closed.

3. A circuit interrupter as recited in claim 2 wherein said lever is pivotally supported upon said mechanism module.

4. A circuit interrupter as recited in claim 3 wherein said mechanism module comprises:

means for producing contact closing motion;

movable means for transmitting said closing motion to said contacts;

means for moving said motion transmitting means into engagement with said motion producing means, said moving means being connected to said interlock lever so that said moving means can maintain said motion transmitting means in engagement with said motion producing means when said control module is fully inserted into said main support structure, and said moving means is prevented from maintaining said motion transmitting means in engagement with said motion producing means when said control module is in any position other than a fully inserted position.

5. A circuit interrupter as recited in claim 4 wherein said means for producing contact closing motion comprises a motor driven shaft and a close cam connected to said shaft;

said motion transmitting means comprises a drive link operatively connected to said contacts; and said means for moving said motion transmitting means comprises a trip latch pivotally supported at the center thereof, a constraining link pivotally supported at one end upon one end of said trip latch and connected at the other end to said drive link, and a rotatable trip shaft removably engageable with the other end of said trip latch.

* * * * *